United States Patent [19]
Hiroshima et al.

[11] Patent Number: 6,118,422
[45] Date of Patent: Sep. 12, 2000

[54] LIGHT SCATTERING TYPE LIQUID CRYSTAL DISPLAY DEVICE, AND METHOD FOR DRIVING IT

[75] Inventors: Kohki Hiroshima, Yamanasi; Kazuhiro Nakagomi; Katsutoshi Higuchi, both of Yamanashi, all of Japan

[73] Assignee: Chisso Corporation, Osaka, Japan

[21] Appl. No.: 08/939,659

[22] Filed: Sep. 29, 1997

[30] Foreign Application Priority Data

Mar. 28, 1997 [JP] Japan ..................................... 9-094941

[51] Int. Cl.$^7$ ....................................................... G09G 3/36
[52] U.S. Cl. .................................................. 345/94; 345/87
[58] Field of Search .............................. 345/87, 94, 95, 345/89; 349/128, 179, 180

[56] References Cited

U.S. PATENT DOCUMENTS

| | | | |
|---|---|---|---|
| 4,239,345 | 12/1980 | Berreman et al. | 349/179 |
| 5,594,464 | 1/1997 | Tanaka et al. | 345/94 |
| 5,889,566 | 3/1999 | Wu et al. | 345/98 |

FOREIGN PATENT DOCUMENTS 6-230751  8/1994  Japan .

*Primary Examiner*—Dennis-Doon Chow
*Attorney, Agent, or Firm*—Oblon, Spivak, McClelland, Maier & Neustadt, P.C.

[57] ABSTRACT

A light scattering type liquid crystal display device is here disclosed which comprises a liquid crystal cell comprising at least electrodes and alignment layers formed on opposite surfaces of a pair of opposite substrates and a chiral nematic liquid crystal layer having a planar structure sealed between the pair of substrates, and a voltage application means for feeding an application voltage to both the electrodes formed respectively on the pair of substrates, wherein by feeding the application voltage having a predetermined voltage waveform to both the electrodes from the voltage application means, a light scattering texture comprising a group of at least 3 planar structures having different twist angles is generated, held or erased in the chiral nematic liquid crystal layer. This display device is not equipped with any polarizing plate, and it has a high utilization efficiency, a wide visual angle and a high-speed response performance and it enables its driving at a low voltage.

11 Claims, 13 Drawing Sheets

(5 of 13 Drawing Sheet(s) Filed in Color)

ARRANGEMENT OF POLARIZING PLATE

SCATTERING HOLDING STATE

RUBBING DIRECTION

INITIAL TRANSMISSION STATE (180° TWIST)

TIME T₁

TIME T₂

TIME (SCATTERING HOLDING STATE)

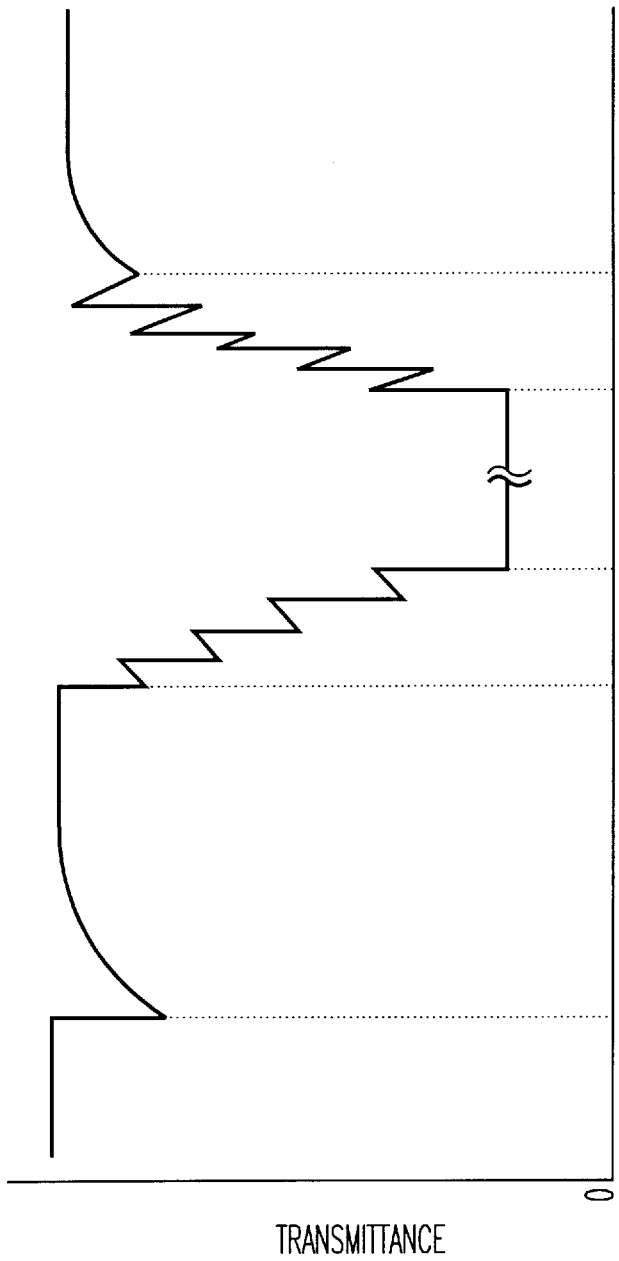
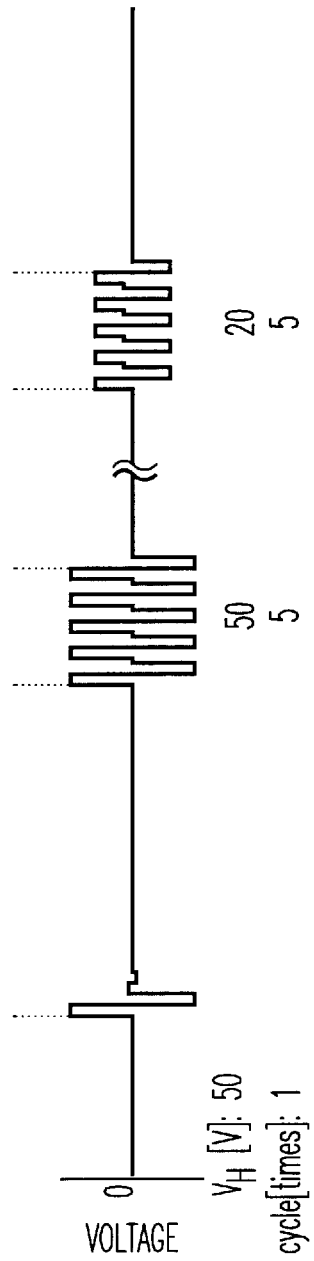
FIG. 5A
FIG. 5B

TIME T$_1$
FIG.6A
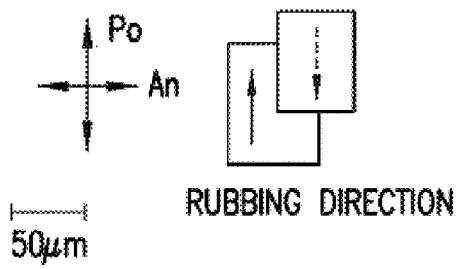
ARRANGEMENT OF POLARIZING PLATE
TIME T$_2$
FIG.6B
TIME T$_3$
FIG.6C
TIME T$_5$
FIG.6D
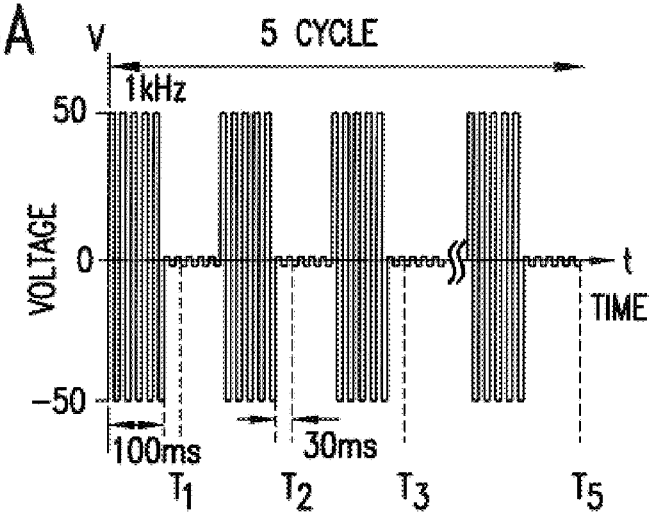
FIG.6F
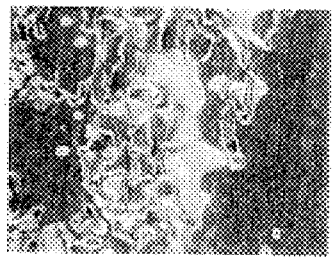
FIG.6E
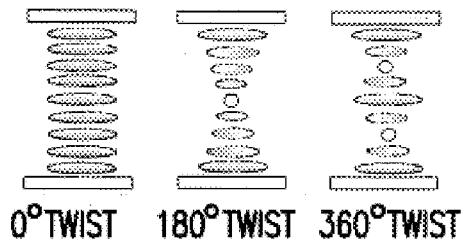
0° TWIST   180° TWIST   360° TWIST

ARRANGEMENT OF POLARIZING PLATE

SCATTERING HOLDING STATE
(CROSSED NICOLS)

SCATTERING HOLDING STATE (POLARIZER)

SCATTERING HOLDING STATE
ARRANGEMENT OF POLARIZING PLATE
RUBBING DIRECTION
100μm

TIME T₁

TIME T₂

TIME T₅ (INITIAL TRANSMISSION STATE)

LIGHT SCATTERING TYPE LIQUID CRYSTAL DISPLAY DEVICE, AND METHOD FOR DRIVING IT

BACKGROUND OF THE INVENTION

1. Field of the Invention

The present invention relates to a liquid crystal display device using no polarizing plate, and a method for driving it. More specifically, it relates to a light scattering type liquid crystal display device which can control a voltage to be applied to a liquid crystal, whereby a texture state of the liquid crystal is changed to bring about light scattering and to thereby control a transmittance of the light, and a method for driving the liquid crystal display device. This display device has a wide visual angle owing to the light scattering type and also enables a reflective type display.

2. Description of the Related Art

At present, in a liquid crystal display device using an electro-optic effect, there is usually employed a TN cell having a twist nematic structure or an STN (supertwist nematic) cell. The display systems of these cells are disclosed in M. Shadt and W. Helfrich, "Appl. Phys. Lett.", Vol. 18 (1971) and T. J. Scheffer and J. Nehring, "Appl. Phys. Lett.", Vol. 45, p. 1021 (1984). As a method for driving these liquid crystal display devices, there can be utilized a simple matrix driving method using a voltage averaging technique, or a driving method using switches of TFTs (thin film transistors) formed at every pixel.

With regard to the simple matrix drive, there have been suggested bistable nematic type liquid crystal display devices having a twist angle of 180° in Japanese Patent Publication No. 51818/1989 (U.S. Pat. No. 4,239,345) and Japanese Patent Application Laid-open No. 230751/1994.

With regard to the liquid crystal display device using no polarizing plate, a DSM (dynamic scattering mode), a PDLC (polymer dispersing liquid crystal mode), a PC (cholestric-nematic phase change mode) and the like have been suggested. The DSM has been invented in 1968 by G. H. Heilmeier et al.

According to the DSM, an ionic current is allowed to flow through a liquid crystal composition to deform the alignment of a liquid crystal molecule, thereby scattering a light. As features of this display method, a liquid crystal material having a negative dielectric anisotropy is used. This method has some problems. For example, a driving voltage is high; a certain current is required; a driver for driving the liquid crystal display device consumes a large electric power; and a conductive material is added to the liquid crystal material, so that the deterioration of the crystal liquid material easily occurs.

In the PDLC, a liquid crystal compound is used in the state of microcapsules. This PDLC has been filed for a patent in 1981 by Fargason et al., and afterward, various dispersion systems of polymeric materials and the liquid crystal materials have been researched.

With regard to the PDLC, the driving voltage is high, as in the DSM, and particularly there is a problem that a saturated voltage is high. As to a response time, a fall velocity is high but a rise velocity is slightly low, and there is a problem that, in voltage-transmittance properties, hysteresis exists.

The PC has been investigated in 1973 by T. Ohtsuka et al. and in 1974 by W. Greubel, and a technique for largely stabilizing the hysteresis has been suggested in 1985 by Mochizuki et al.

The PC (phase change mode) can increase the hysteresis in the voltage-transmittance properties increases, can possess a memory ability and enables the driving under bistability and the display of a large capacity. However, this method has a problem that a gradation display cannot be given owing to the bistability.

The TN mode and the STN mode which have mainly been used as the present liquid crystal display systems have the problems of the narrow visual angle and the low light transmittance. These problems are inherent in the display mode using two polarizing plates. In order to solve these problems, there is a technique of raising the brightness of a back light installed on the back surface of the liquid crystal display device. In this method, however, the electric power to be consumed increases. In consequence, the feature of the liquid crystal display that the consumption of the electric power is small is lost sometimes.

On the other hand, as one of the liquid crystal display devices using the polarizing plates, there have been suggested bistable nematic type liquid crystal display devices in Japanese Patent Publication No. 51818/1989 and Japanese Patent Application Laid-open No. 230751/1994. In the former, the principle of switching of the device is only described, and the response time of the display device is extremely long. The latter describes the driving method of a simple matrix in detail, and also discloses the display device in which the response time is extremely shortened. In each of the above techniques, the two polarizing plates are used, and the display is accomplished by the utilization of electro-optic characteristics on the basis of a birefringence effect. These techniques can more largely expand the visual angle as compared with the STN system, but owing to the bistability, the gradation display is difficult. Furthermore, since the polarizing plates are used, a light utilization efficiency is poor. In order to solve these problems, a technique of raising the brightness of the back light can be employed, but in this case, the consumption of the electric power increases, and the feature of the small electric power consumption in the liquid crystal display device is lost.

SUMMARY OF THE INVENTION

The present inventors have researched with the intention of solving the above problems, and as a result, it has been found that when a predetermined voltage waveform is applied to a planar structure (a parallel alignment structure) of a chiral nematic liquid crystal, a light scattering texture appears and this state is kept up for a long period of time. Furthermore, it has been found that when a voltage of about several volts is applied to a memory state in which this light scattering texture is held for a long period of time, a degree of the scattering can be controlled, and when the voltage waveform is regulated, the light scattering texture can disappear and an initial light transmission state can return.

The present invention has been developed on the basis of the above knowledge, and an object of the present invention is to provide a polarizing plate-free light scattering type liquid crystal display device which has a high light utilization efficiency and a wide visual angle and which enables a low voltage drive and a high-speed response. Another object of the present invention is to provide a method for driving the liquid crystal display device.

The present invention includes the following aspects.

A light scattering type liquid crystal display device which comprises a liquid crystal cell comprising at least electrodes and alignment layers formed on opposite surfaces of a pair of opposite substrates and a chiral nematic liquid crystal layer having a planar structure sealed between the pair of substrates, and a voltage application means for feeding an application voltage to both the electrodes formed respectively on the pair of substrates, wherein by feeding the application voltage having a predetermined voltage waveform to both the electrodes from the voltage application means, a light scattering texture comprising a group of at least 3 planar structures having different twist angles is generated, held or erased in the chiral nematic liquid crystal layer.

A method for driving a light scattering type liquid crystal display device which comprises a liquid crystal cell comprising at least electrodes and alignment layers formed on opposite surfaces of a pair of opposite substrates and a chiral nematic liquid crystal layer having a planar structure sealed between the pair of substrates, and a voltage application means for feeding an application voltage to both the electrodes formed respectively on the pair of substrates, wherein by feeding the application voltage having a predetermined voltage waveform to both the electrodes from the voltage application means, a light scattering texture comprising a group of at least 3 planar structures having different twist angles is generated, held or erased in the chiral nematic liquid crystal layer, said method comprising the step of repeatedly applying at least 3 cycles of an intermittent pulse voltage to both the electrodes from the voltage application means.

A method for driving a light scattering type liquid crystal display device which comprises a liquid crystal cell comprising at least electrodes and alignment layers formed on opposite surfaces of a pair of opposite substrates and a chiral nematic liquid crystal layer having a planar structure sealed between the pair of substrates, and a voltage application means for feeding an application voltage to both the electrodes formed respectively on the pair of substrates, wherein by feeding the application voltage having a predetermined voltage waveform to both the electrodes from the voltage application means, a light scattering texture comprising a group of at least 3 planar structures having different twist angles is generated, held or erased in the chiral nematic liquid crystal layer, said method comprising the step of repeatedly applying at least 3 cycles of an intermittent pulse having a voltage, which is lower than a voltage for generating the light scattering texture in the chiral nematic liquid crystal layer, to both the electrodes from the voltage application means, thereby erasing the light scattering texture.

A method for driving a light scattering type liquid crystal display device which comprises a liquid crystal cell comprising at least electrodes and alignment layers formed on opposite surfaces of a pair of opposite substrates and a chiral nematic liquid crystal layer having a planar structure sealed between the pair of substrates, and a voltage application means for feeding an application voltage to both the electrodes formed respectively on the pair of substrates, wherein by feeding the application voltage having a predetermined voltage waveform to both the electrodes from the voltage application means, a light scattering texture comprising a group of at least 3 planar structures having different twist angles is generated, held or erased in the chiral nematic liquid crystal layer, said method comprising the step of applying a predetermined alternating voltage to both the electrodes from the voltage application means to change a light scattering ability of the light scattering texture, thereby accomplishing a gradation display.

According to a light scattering type liquid crystal display device of the present invention, a light scattering texture containing at least 3 regions having different twists is generated, held or erased in a liquid crystal layer by repeatedly applying several cycles of an intermittent pulse (an alternating waveform comprising a combination of predetermined waveforms having different amplitudes) to both the electrodes of a liquid cell. Furthermore, in a condition where the light scattering texture is maintained, when a predetermined alternating voltage having a predetermined waveform is applied to both the electrodes of the liquid cell, there can be shown electro-optic characteristics in which transmittance changes in compliance with the applied voltage. By the use of the electro-optic characteristics, a gradation display can be achieved.

This liquid crystal display device can accomplish the display, even if any polarizing plate is not used, and therefore the light utilization efficiency is also higher than in the case of a TN liquid display device. Therefore, the bright display device can be obtained. In addition, the liquid display device of the present invention is also promising as a reflective type display device. In the case that the transmittance is changed in compliance with the voltage, an operation voltage can also be lowered to a much lower level as compared with a PDLC. Accordingly, the liquid crystal display device of the present invention is also promising as the display device for a portable information terminal equipment.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 5 is a schematic view explaining a formation step and an erasure step of the light scattering texture.

FIG. 6 is an illustrative view explaining the structure of the light scattering texture.

DETAILED DESCRIPTION OF THE INVENTION

Figure 1:
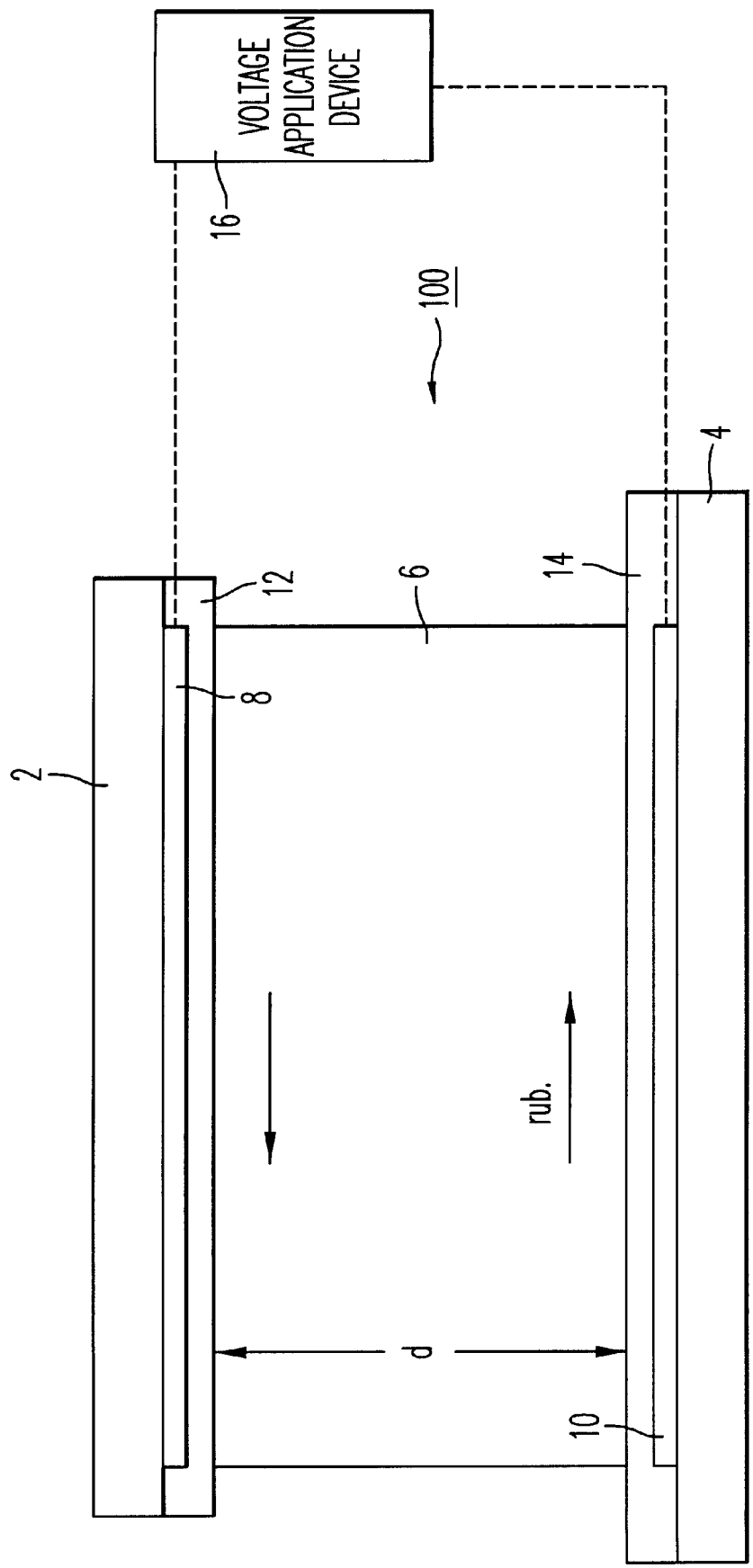
FIG. 1 is a schematic constitutional view showing one embodiment of a liquid crystal cell regarding the present invention.

The constitutions of the present invention will be described as follows.

(1) A light scattering type liquid crystal display device in which at least electrodes and alignment layers are formed in this order on the surfaces of substrates; the pair of substrates are arranged, a predetermined space being interposed therebetween so that the alignment layers may be opposite to each other; a chiral nematic liquid crystal is sealed between the substrates; the chiral nematic liquid crystal has a structure for generating a twist angle in an initial condition; a liquid crystal layer is transparent during no voltage application; a light scattering state is generated and held in the liquid crystal layer by applying an alternating waveform comprising a combination of predetermined waveforms and the voltage (hereinafter abbreviated to "an intermittent pulse") to both the electrodes; and afterward, the transmittance of the liquid crystal layer can be changed in compliance with the application voltage to be applied to both the electrodes.

(2) In the light scattering type liquid crystal display device of the above (1), a light scattering state can be generated by applying at least 3 cycles of the intermittent pulse to the initial liquid crystal layer which is transparent during no voltage application, and afterward, the liquid crystal layer can be returned to the initial transparent state by applying at least 3 cycles of the intermittent pulse having a lower voltage (a quasi-voltage) than the above intermittent pulse.

(3) In the light scattering type liquid crystal display device of the above (1), the light scattering state can be generated and held by applying at least 3 cycles of the intermittent pulse having a predetermined voltage to the liquid crystal layer which is transparent during no voltage application, and afterward, the transmittance of the light can be changed in accordance with the alternating voltage by applying an alternating wave, whereby a gradation display is possible. Next, the liquid crystal layer can be returned to the initial transparent state by applying at least 3 cycles of the intermittent pulse having a lower voltage (a quasi-voltage) than the intermittent pulse for generating a light scattering texture.

(4) In the light scattering type liquid crystal display device of the above (1), the chiral nematic liquid crystal layer is arranged so that a twist angle may be in the range of 90° to 270° in an initial state. According to this device, the light scattering texture comprising at least 3 fine planar structures having different twist angles can be formed by applying at least 3 cycles of the intermittent pulse, and the light scattering state can be held (memory). Twist angles of the three planar structures are 180°, 0° (no twist) and 360°, for example, in the case that the initial twist angle is 180° C. And boundaries and intermediate regions which may exist between the planar structures are observed as the light scattering parts in the light scattering textures. The structures of the boundaries and intermediate regions are so complex that the structure may not be clearly defined.

Kinds of planar structures are not limited to 3 kinds as in the above embodiment, and 3 or more kinds of planar structures may simultaneously be present. Furthermore, the structures which cannot clearly be classified may simultaneously be present.

(5) The alignment layers are applied onto the substrates, and the alignment direction of the liquid crystal is constituted so as to be in the range of 90° to 270° with respect to the pair of substrates, and a pretilt angle is set in the range of 0° to 30°, whereby there can easily be accomplished the generation of the light scattering which occurs by applying the intermittent pulse and the retention of the light scattering state.

(6) With regard to a ratio between a natural pitch $P_0$ of the chiral nematic material interposed between the substrates and a thickness d of the liquid crystal layer, when the layer thickness/the pitch is in the range of 0.3 to 1.0, the generation of the light scattering by the intermittent pulse having the predetermined voltage and the retention of the light scattering state can easily be achieved.

(7) In the case that as the liquid crystal material, there is used a liquid crystal composition containing 50% by weight of one or more liquid crystal compounds selected from the group consisting of phenylcyclohexanes, cyclohexylcyclohexanes, cyclohexyl, bicyclohexyl and cyclohxylphenyl esters of benzoic acid, phenyl, cyclohexylphenyl, bicyclohexyl and cyclohexyl esters of cyclohexanecarboxylic acid, cyclohexylbiphenyls, 4,4'-dicyclohexylbiphenyls, phenyl and cyclohexyl esters of cyclohexylbenzoic acid, phenyl and cyclohexyl esters of cyclohexylcyclohexanecarboxylic acid, phenyl-1,3-dioxanes and cyclohexyl-1,3-dioxanes, the generation of the light scattering by the intermittent pulse having the predetermined voltage and the retention of the light scattering state can easily be achieved.

(8) According to the method for driving the light scattering type liquid crystal display device of the present invention, the electrodes and the alignment layers are formed in this order on the surfaces of the substrates, and the chiral nematic liquid crystal is sealed between the pair of substrates which are arranged, the space being interposed so that the alignment layers may be opposite to each other. The chiral nematic liquid crystal is constituted so that the twist angle may be in the range of 90° to 270° in the initial state, and at least 3 fine planar structures having different twist angles can be formed in the liquid crystal by applying at least 3 cycles of the intermittent pulse having the predetermined voltage and the light scattering state can be held. Next, an alternating voltage wave is applied to the electrodes to enable the control of the light scattering state, and afterward, at least 3 cycles of the intermittent pulse having a lower voltage than the predetermined voltage is applied to the electrodes to erase the light scattering texture.

In order to generate the light scattering texture, a voltage waveform of the intermittent pulse has a threshold value, and the quasi-voltage of the intermittent pulse for erasing the light scattering texture also possesses a threshold voltage. In the condition where the light scattering state is maintained, by applying an alternating voltage wave, the liquid crystal layer shows the electro-optic characteristics, whereby the gradation display can be accomplished.

Next, the present invention will be described in detail with reference to drawings.

FIG. 1 shows a schematic constitution of a liquid crystal cell for use in a liquid crystal display device of the present invention.

In FIG. 1, reference numeral 100 is a liquid crystal cell, and in this cell 100, a chiral nematic liquid crystal layer 6 is sealed between a pair of substrate 2, 4. On the mutually opposite surfaces of the substrates 2, 4, electrodes 8, 10 and alignment layers 12, 14 are formed in this order from the substrate surfaces. Numeral 16 is a voltage application means for feeding an application voltage having a predetermined voltage and waveform to the transparent electrodes 8, 10.

In an initial state, the chiral nematic liquid crystal layer 6 has a twisted structure of a twist angle φ. The twist angle φ in the initial state can be set to an optional angle, but it is preferably set in the range of 90° to 270°, and it is most suitable to set the angle to about 180°.

The substrates 2, 4 are preferably made of a transparent glass and quartz.

The transparent electrodes 8, 10 are made of a transparent conductive material such as indium oxide.

The alignment layers 12, 14 are constituted by covering the substrates 2, 4 with layers of a polymer such as PVA (polyvinyl alcohol) or a polyimide, and then subjecting the layers to a rubbing treatment, by subjecting $SiO_2$ or the like to a rhombic vapor deposition treatment, or by irradiating a polymer molecule with UV. A pretilt angle of a liquid crystal molecule in the liquid crystal layer 6 which is formed with these alignment layers 12, 14 is preferably in the range of 0° to 30°. In this angle range, the preferable pretilt angle can be set in compliance with the kind of alignment layers. Furthermore, the pretilt angle can be set in a range where the generation of a light scattering texture by an intermittent pulse having a predetermined voltage and the retention of a light scattering state can easily be achieved.

The chiral nematic liquid crystal layer 6 can be obtained by adding a chiral agent to a nematic liquid crystal composition showing a positive dielectric anisotropy, and then regulating a helical pitch to a predetermined value. A desired value $P_0$ of a natural pitch of the liquid crystal material can be decided in consideration of a thickness d of the liquid crystal layer 6. A value of $d/P_0$ which is a ratio of these factors is suitably in the range of 0.3 to 1.0. Examples of the usable chiral agent include liquid crystal chiral agents such as C15 (made by BDH), CB15 (made by BDH), CM-33 (made by Chisso Corporation) and CM-34 (made by Chisso Corporation), and cholesteryl nonanoate of a cholesterol series. It is preferred to use the chiral agent having a helical twist power which enables the achievement of the desired pitch value by adding its small amount, because such a chiral agent has a less influence on the physical properties of the nematic liquid crystal composition.

In the nematic liquid crystal composition, one or more kinds of liquid crystal compounds mentioned in the above (7) are preferably contained in an amount of 50% by weight or more with respect to the total liquid crystal composition. The dielectric anisotropy of these liquid crystal compounds is positive.

Figure 2:
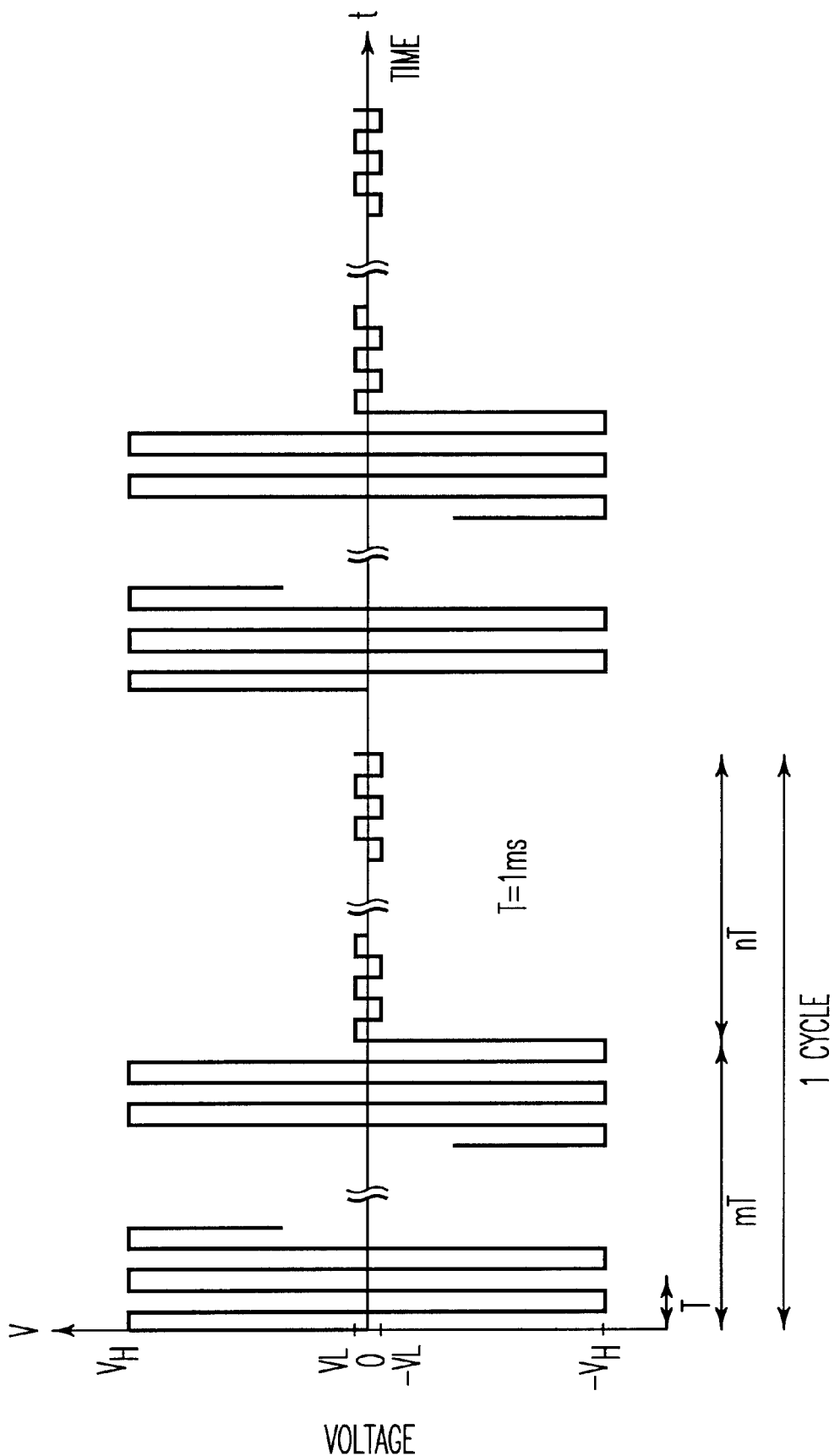
FIG. 2 is a voltage waveform view showing one embodiment of an intermittent pulse to be applied to the electrodes of the liquid crystal cell in the present invention.

FIG. 2 is one example of an application voltage waveform. In the present invention, the intermittent pulse is an alternating waveform comprising a combination of a predetermined waveform and a voltage, as described above. This intermittent pulse is represented by, for example, a pulse row in a range of "1 cycle" in FIG. 2. That is to say, the intermittent pulse is a combination of m pulse rows (a front pulse) having an amplitude $2V_H$ within a first time mT and n pulse rows (a back pulse) having an amplitude $2V_L$ within a successive time nT. This is counted as 1 cycle. The amplitude $2V_L$ of the n pulse rows is smaller than the amplitude $2V_H$ of the first m pulse rows. In this connection, a time period T in FIG. 2 is a width of a unit pulse constituting the intermittent pulse.

The amplitudes $2V_H$, $2V_L$ of the intermittent pulse, the numbers m, n and the pulse width T depend on the kind of selected liquid crystal compound, a cell structure and the like, and they can be suitably decided through experiments by a person skilled in the art. A value of the $V_H$ is required to be a voltage of a certain level or more, and a value of the $V_L$ is required to be a voltage of a limiting level or less inclusive of 0 V.

In general, it is preferred that the $V_H$ is in the range of 10 to 100 V; $V_H/V_L$ is 1.5 or more; m is in the range of 10 to 1000; n is in the range of 10 to 1000; and T is in the range of about 10 psec to 30 msec.

A cycle number is preferably 3 cycles or more, more preferably 5 to 25 cycles.

Figure 3:
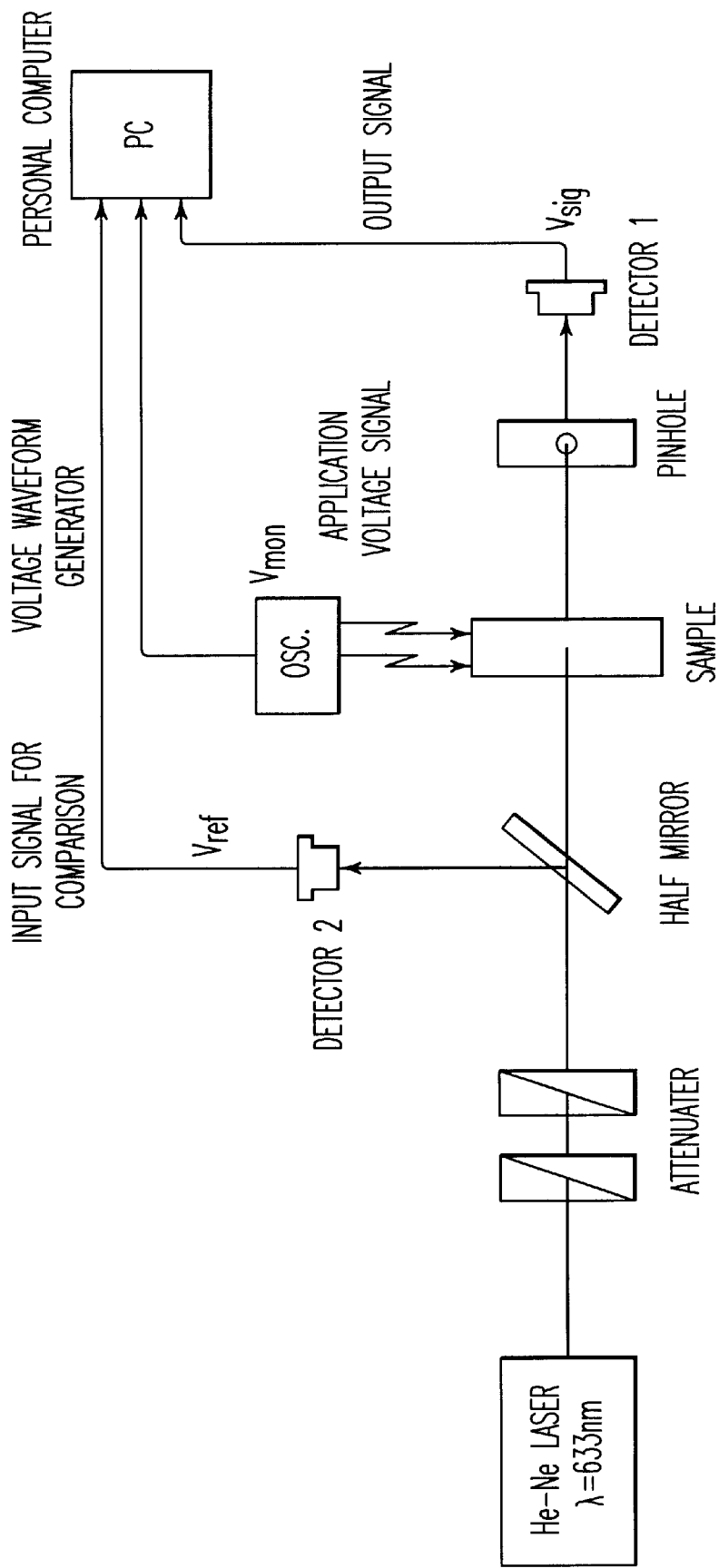
FIG. 3 is a block diagram showing a transmittance measurement system of the liquid crystal cell.

FIG. 3 shows a schematic view of a measurement procedure of a transmittance. The measurement procedure is known.

Figure 4A:
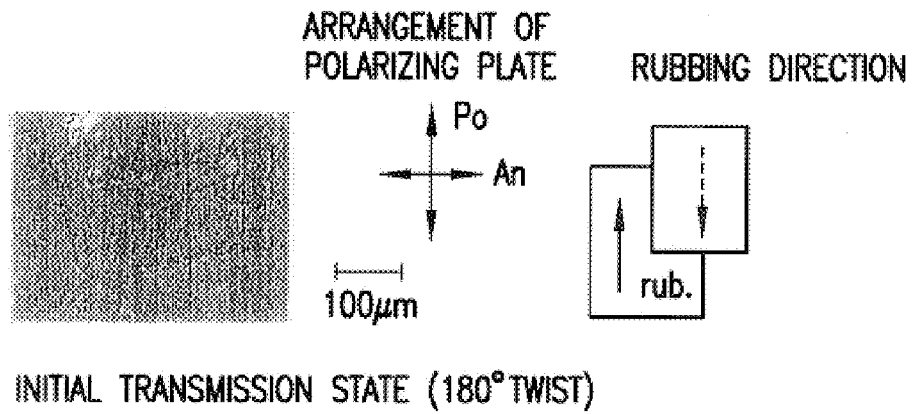
FIG. 4 is an illustrative view showing a formation process of a light scattering texture in a liquid crystal layer in the present invention.

FIG. 4(a) is a photograph obtained by observing an initial state before the voltage application of the liquid crystal cell for use in the liquid crystal display device of the present invention between crossed nicols by the use of a polarizing microscope. The twist angle of the liquid crystal is 180°. In FIG. 4, symbols Po and An of arrows showing the arrangement of polarizing plates represent a polarizer and an analyzer, respectively. Also in FIGS. 6, 7, 8 and 10, these symbols have the same meanings. The initial state of the chiral nematic liquid crystal of this liquid crystal cell has a planar structure having a twist angle of 180°. Therefore, when the liquid crystal is observed without using any polarizing plates, a light is straight transmitted as it is, so that a transparent state in which any scattering is not present is observed.

Figure 4B:
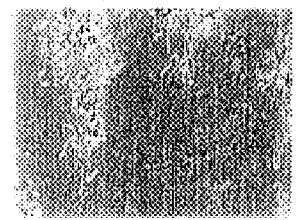

In this transparent liquid crystal state, when square waves of the $V_H$=50 V and the $V_L$=0.5 V which are such voltage waveforms as shown in FIG. 2 are applied to both the electrodes every 100 ms (1 cycle), respectively, domains which are different in a disclination line and retardation are generated as shown in FIG. 4(b), so that the light is scattered.

In FIG. 2, the range represented by mT is a range to which a voltage square wave of the $V_H$=50 V has been applied, and the range represented by nT is a range to which a voltage square wave of the $V_L$=0.5 V has been applied. In this case, m=n=100.

Figure 4C:
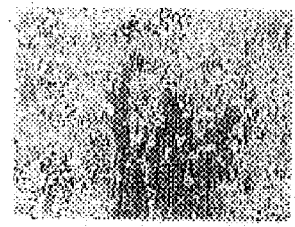

In the case that 1 cycle of the voltage pulse is applied, the state of the liquid crystal layer returns to the initial state of no scattering shown in FIG. 4(a) with time. Similarly, the state of the liquid crystal layer in the case that 2 cycles of the voltage pulse are applied to both the electrodes is shown in FIG. 4(c). Also in this case, the state of the liquid crystal becomes a state in which the light is scattered, but it returns to the initial state of no scattering shown in FIG. 4(a) with time.

Figure 4D:
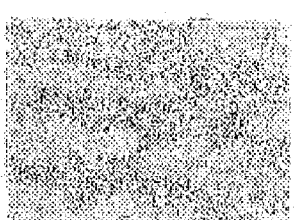
Figure 4E:
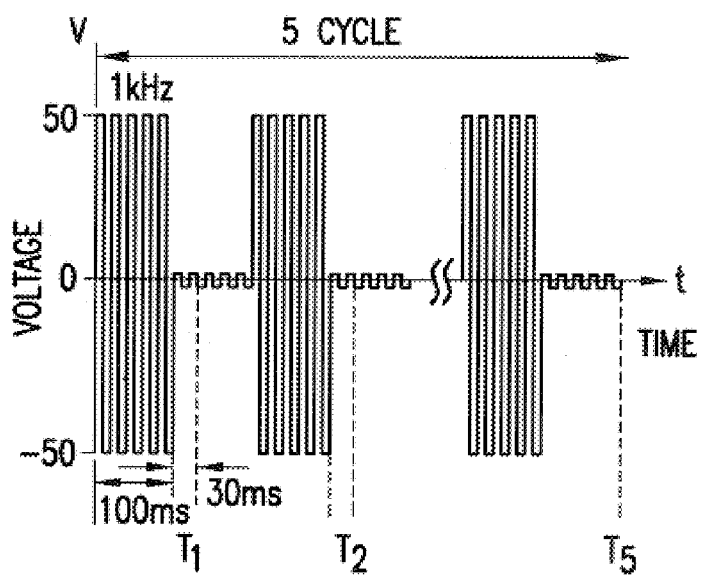

However, when 3 or more cycles of the intermittent pulse shown in FIG. 2 are repeatedly applied to both the electrodes, the domains in the liquid crystal are finely divided as shown in FIG. 4(d), so that the degree of the scattering heightens. Moreover, when 3 or more cycles are repeatedly applied, the light scattering texture can be held for a long period of time. This phenomenon has been discovered by the present inventors.

FIG. 5 schematically shows a series of the changes of the light scattering texture.

Afterward, in the voltage waveform shown in FIG. 2, when 3 or more cycles of the intermittent pulses in which the values alone of the voltage are changed to the $V_H$=20 V and $V_L$=0.2 V are applied to both the electrodes, the light scattering texture of the liquid crystal layer returns to the initial state, so that the transparent state is exhibited.

FIG. 5 shows a relation between the applied voltage waveform and the transmittance of the liquid crystal layer which changes in compliance with the applied voltage waveform. Here, the $V_H$ for erasing the light scattering texture is lower than the voltage for bringing about the scattering, and the $V_H$ is effective in a certain voltage range. The value of the $V_L$ is also required to be a voltage of a certain limiting level or less inclusive of 0 V.

The $V_H$ for erasing the light scattering texture is preferably in the range of 5 to 50 V, and $V_H/V_L$ is preferably 1.5 or more. In addition, m, n and t are as described above.

In the schematic graph of FIG. 5, the abscissa axis denotes the time, and the ordinate axis denotes the transmittance.

The first left portion of the time axis shows that the transmittance returns to the original initial state with time, even if 1 cycle is applied under conditions of the $V_H$=50 V and the $V_L$=0.5 V. The next time zone shows that 5 cycles of the intermittent pulse are applied under conditions of the $V_H$=50 V and the $V_L$=0.5 V. In this case, the transmittance decreases every the application of the pulse, and after the application of 5 cycles, the decreased transmittance is held as it is. In the next time zone, there are applied 5 cycles of the intermittent pulses having the voltages of the $V_H$=20 V and the $V_L$=0.2 V which are lower than in the above time zone. In this case, the transmittance of the liquid crystal layer slowly increases, and after the application of 5 cycles, the transmittance returns to the original initial state. FIG. 5 shows that the transmittance returns to the initial state by the application of 5 cycles of the intermittent pulses, but it is also observed that the transmittance returns to the initial state by the application of 3 or more cycles.

The light scattering texture shown in FIG. 4 is observed under an increased magnification by a polarizing microscope, and the results of the observation are shown in FIG. 6. The drawings (b), (c) and (d) in FIG. 4 correspond to the drawings (a), (b) and (d) in FIG. 6, respectively. That is to say, in FIG. 4(*a*), the domains are scarcely observed. In FIG. 4(*b*) and FIG. 6(*a*), the large domains and the fine domains are observed, but they are not generated all over yet. In FIG. 6(*b*) and FIG. 6(*c*), it is observed that the fine domains increase in accordance with the number of the applied pulse, and in FIG. 4(*d*) and FIG. 6(*d*), it is observed that the fine domains (the microdomains) are generated all over.

Figure 7A:
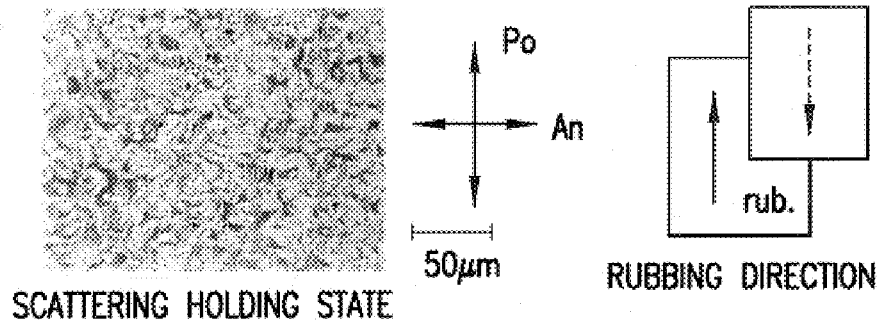
FIG. 7 is a model view of the light scattering texture.
Figure 7B:
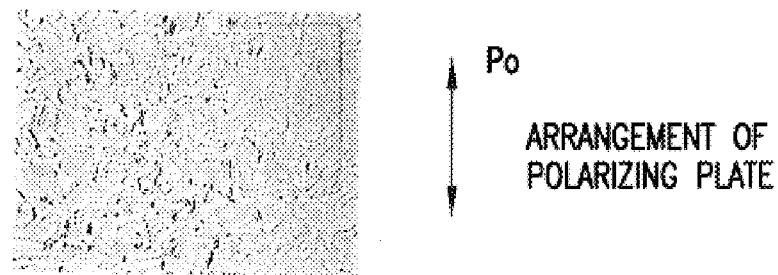
Figure 7C:
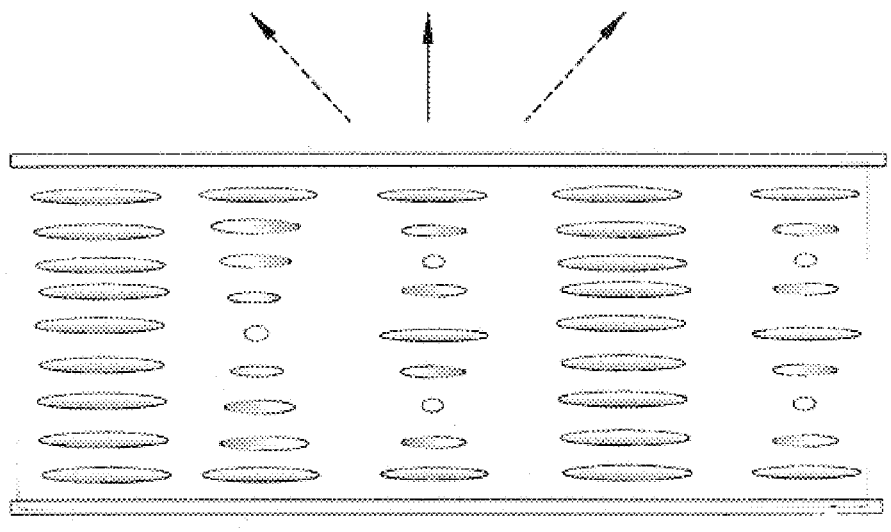
Figure 8A:
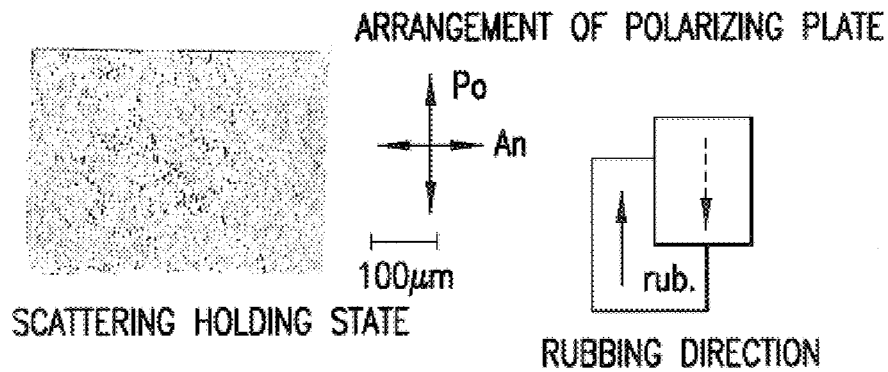
FIG. 8 is an illustrative view explaining the erasure step of the light scattering texture.
Figure 8B:
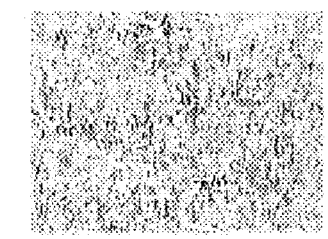
Figure 8C:
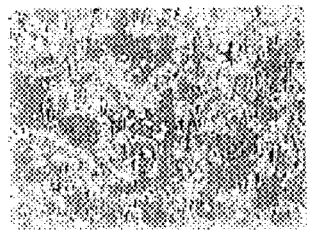
Figure 8E:
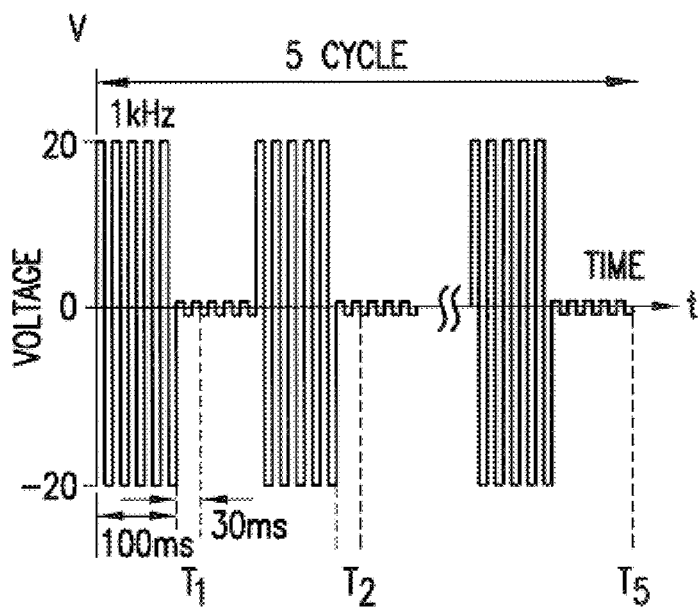
Figure 8D:
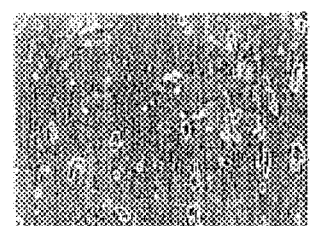

It can be understood from FIG. 6(*d*) that in the liquid crystal layer having the light scattering state, the microdomains are generated. In the state shown in FIG. 6(*b*), there are inspected a retardation value and a voltage at a Frederick's transition of each domain in a portion where the domains relatively increase. As a result, it is apparent that three kinds of regions in all, i.e., a 180° twisted planar structure which is the initial state, 0° and 360° twisted regions are simultaneously present. This fact is explained in FIG. 6(*e*). The light scattering texture models in FIG. 4(*d*) and FIG. 6(*d*) are explained in FIG. 7. It can be presumed that the fine light scattering texture is also constituted of the boundaries, the intermediate regions and the microdomains having three kinds of planar structures in which twist angles are different, as shown in FIG. 7(*c*).

The process of erasing the light scattering texture is shown in a polarizing microscope photograph of FIG. 8. FIG. 8(*a*) shows the light scattering state. In this state, when 5 cycles of intermittent pulses (quasivoltages) of 1 KHz, the $V_H$=20 V and the $V_L$=0.5 V are applied, most of the domains are erased as shown in FIG. 8(*d*), and the transmittance returns to the initial state.

FIG. 8(*b*) and FIG. 8(*c*) show the light scattering textures by the application of 1 cycle and 2 cycles, respectively. These photographs exhibit the erasure steps of the light scattering textures. It is apparent from these photographs that the light scattering textures decrease and the small domains change into the large domains in accordance with the number of the applied cycle(s).

Incidentally, in these photographs, an enlarged observation is made between crossed nicols by the polarizing microscope. When 5 cycles of the intermittent pulse are applied to the liquid crystal layer, the liquid crystal layer returns to the initial state. Polarizing microscope photographs at this time are in a dark state, and only the boundaries and the intermediate of remaining domains are observed. When the liquid crystal cell is observed through the polarizing microscope without using any polarizing plates, it is apparent that the light is scarcely transmitted in a scattering holding state, and the light is transmitted in the initial state [FIG. 8(*d*)].

Next, reference will be made to the gradation display.

Figure 9:
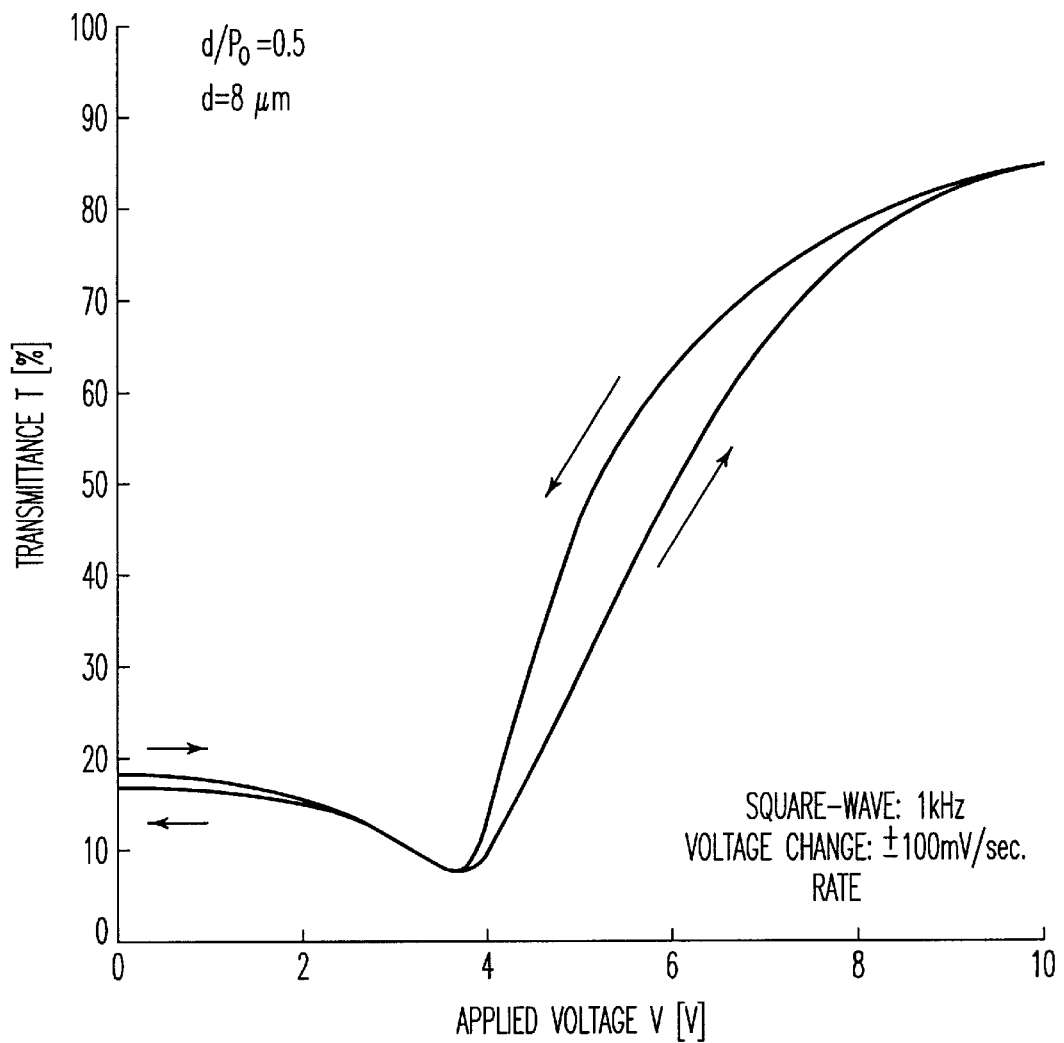
FIG. 9 is a graph showing a relation between the transmittance of the liquid crystal cell and the applied voltage.

After the light scattering texture state in FIG. 4(*d*) is maintained, a square-wave AC of a duty =50% and 1 KHz is applied thereto in place of such an intermittent pulse as shown in FIG. 2, and at this time, there appear such a transmittance and such an applied voltage properties of the liquid crystal cell as shown in FIG. 9. It has been found that when the voltage to be applied is heightened, the transmittance rises correspondingly. Incidentally, a transmittance of 100% means a value of the transmittance measured under conditions that the liquid crystal cell is not put in a transmittance measurement system.

As is definite from FIG. 9, it has also been observed that a slight hysteresis takes place during a rise and the fall process of the voltage to be applied.

Even if a square wave of a duty=50%, an amplitude 10 V and 1 KHz is applied, the liquid crystal cell returns to the original scattering state and the change of the light scattering texture is not observed, when the voltage is cut after the application of the voltage.

Figure 10:
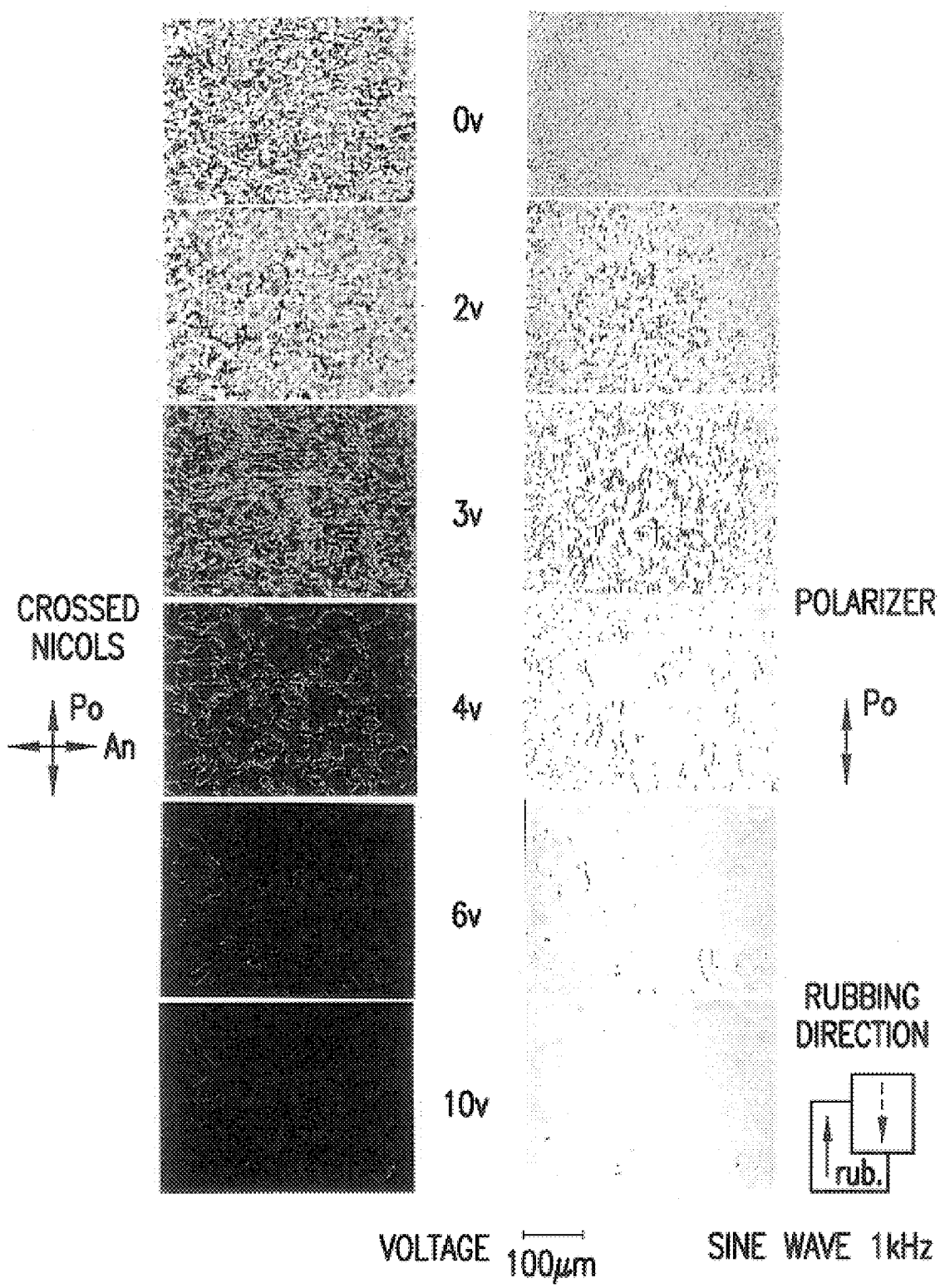
FIG. 10 is an illustrative view showing a change of the light scattering texture by an electric field.

FIG. 10 shows polarizing microscope photographs of the light scattering textures corresponding to the applied voltages. In FIG. 10, the left photographs having the indication of "crossed nicols" and showing the texture change are photographs observed between crossed nicols. Therefore, when the voltage to be applied rises, the liquid crystal layer scarcely transmits the light.

The right photographs having the indication of "polarizer" and showing the textures are made by the use of a polarizer alone, and therefore the light scattering textures are observed under all the voltages, in contrast to the observation between crossed nicols.

Figure 11:
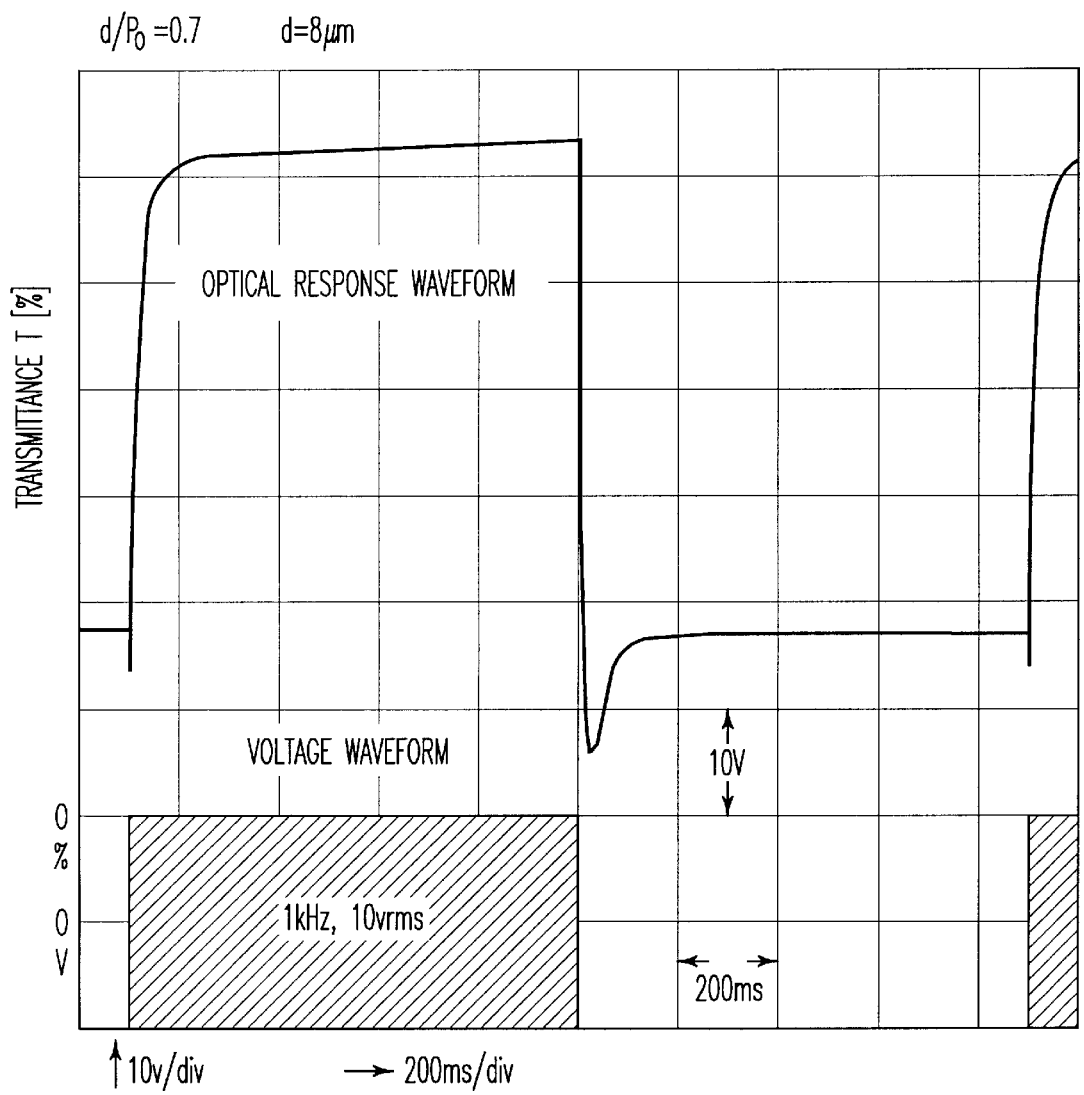
FIG. 11 is a graph showing optical response properties.

In the state in which the light scattering texture of FIG. 4(*d*) is maintained, the measured results of optical response properties in the case that an alternating square wave of 10 V and 1 KHz is applied are shown in FIG. 11. As shown in FIG. 11, the transmittance of the liquid crystal layer is high during a period when an alternating square wave voltage of 1 KHz is applied.

Preferably, the alternating square wave is in the range of 20 to 100 KHz, the duty is in the range of 50 to 0.5%, and the amplitude is in the range of 2 to 20 V.

In order to mix and generate three kinds of twists for generating the light scattering state shown in FIG. 4(*d*), the range of an optimum value is present between a liquid crystal cell thickness d and a natural pitch $P_0$ of the liquid crystal. A d/$P_0$ ratio which can generate the light scattering texture which can sufficiently decrease the transmittance is in the range of 0.3 to 1.0.

Figure 12:
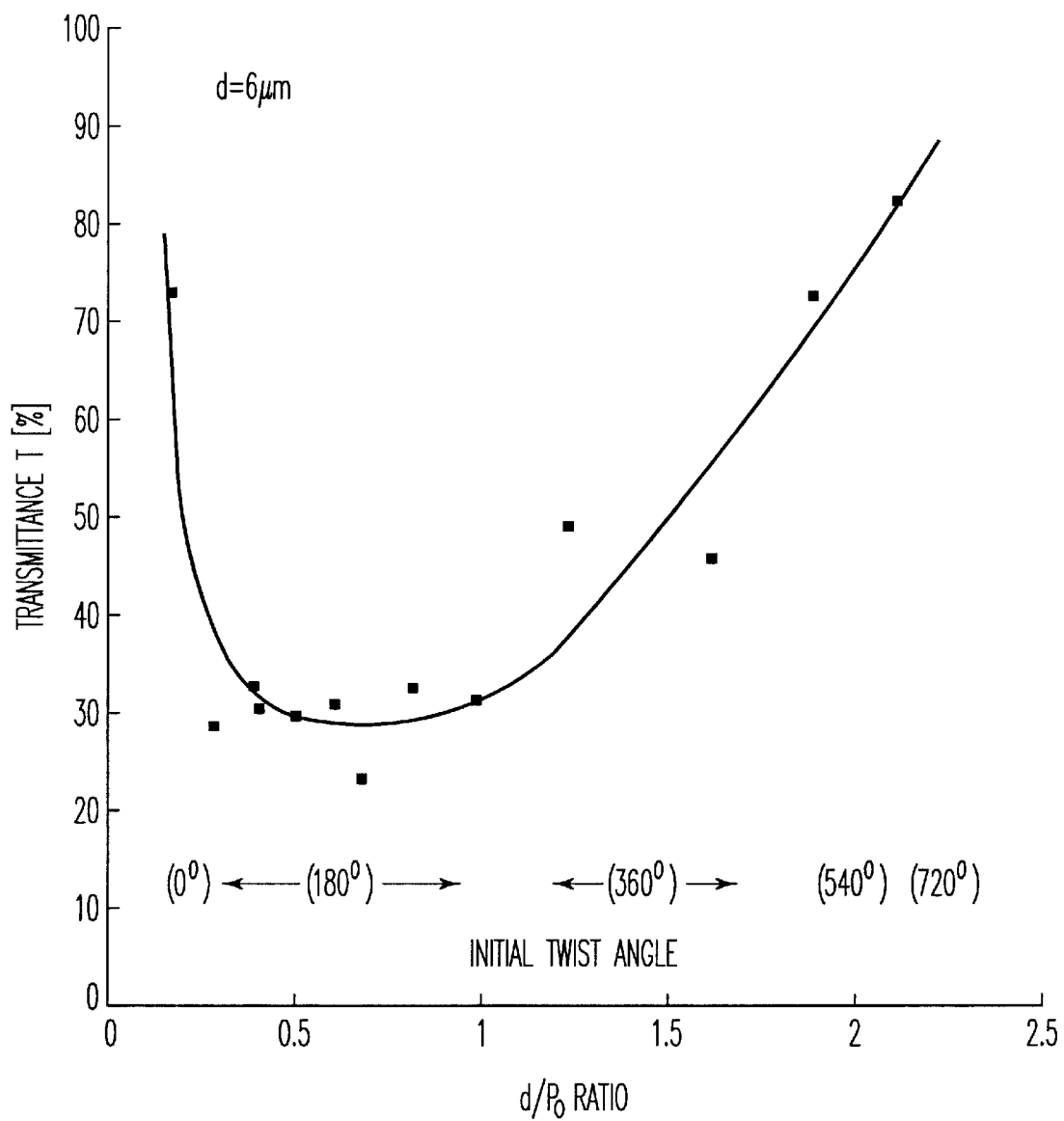
FIG. 12 is a graph showing a relation between the transmittance of the liquid crystal cell and $d/P_0$.

FIG. 12 shows a relation between the transmittance of the light scattering texture and the d/$P_0$. When the d/$P_0$ is in the range of 0.3 to 1.0, the transmittance is in the range of 20 to 30%, and this is a low value. In this range, a scattering intensity is large. Incidentally, a transmittance of 100% means a value of the transmittance measured under conditions that the liquid crystal cell is not put in a transmittance measurement system.

Figure 13:
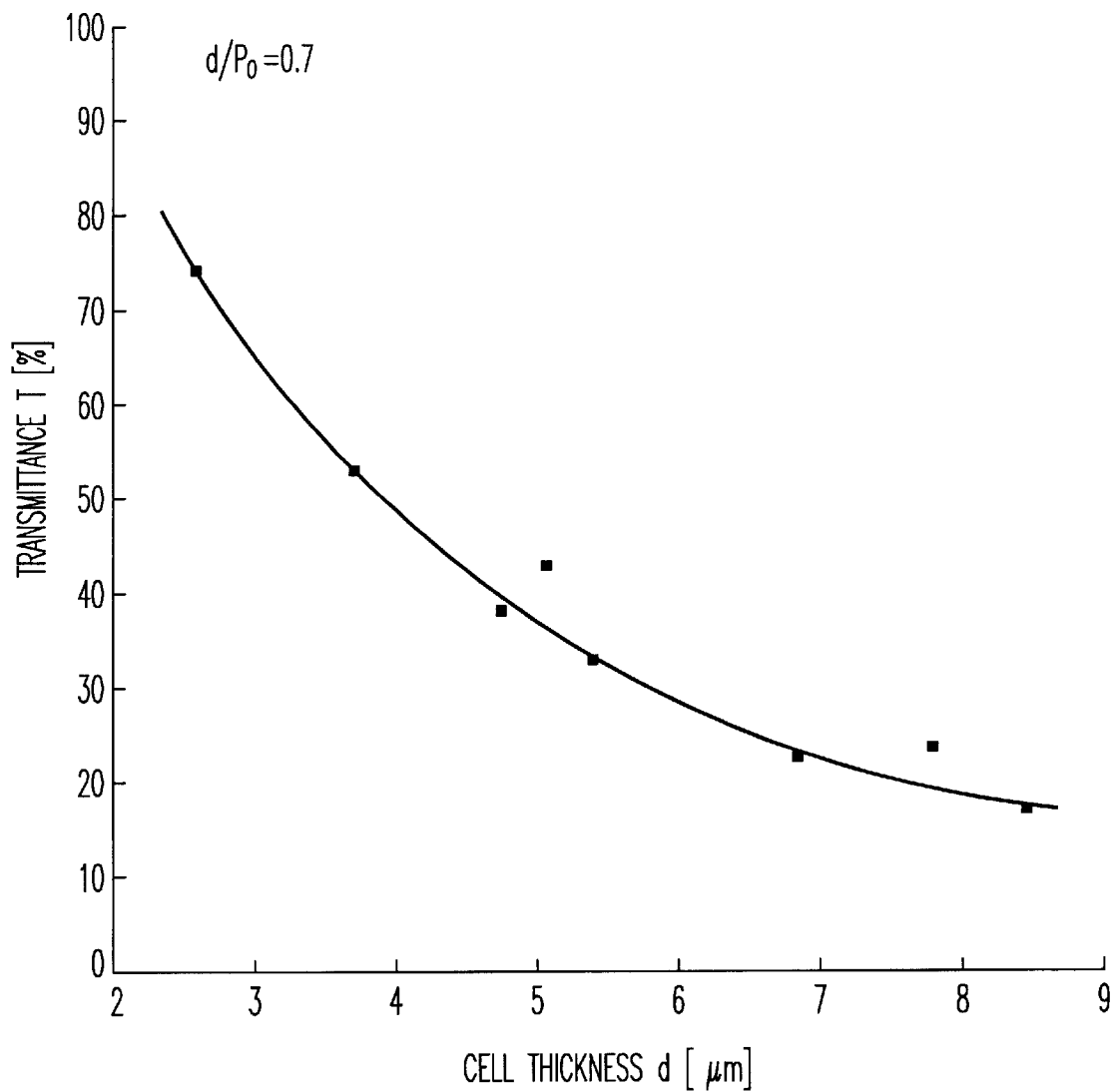
FIG. 13 is a graph showing a relation between the transmittance of the liquid crystal cell and a cell thickness.

A relation between the transmittance of the light scattering texture and the liquid crystal cell thickness is shown in FIG. 13. With the increase of the cell thickness, a degree of the scattering also increases. On the other hand, the intermittent pulse voltage necessary to form the light scattering texture also increases. In order to lower the transmittance for the purpose of increasing a contrast, the cell thickness is increased, but the height of the intermittent pulse voltage is restricted for commercial applications. Also with regard to a response speed, the response speed becomes low in proportion to the liquid crystal cell thickness, and so it is necessary to set an optimum cell thickness.

EXAMPLES

Next, the present invention will be described in more detail with reference to examples, but the scope of the present invention should not be limited to these examples at all.

Example 1

A liquid crystal cell having a constitution shown in FIG. 1 was prepared.

On the surface of a glass substrate, an ITO (an indium oxide thin film) was deposited to form a transparent electrode. Furthermore, this transparent electrode was coated with a polymer layer. Afterward, the polymer layer was rubbed to align a liquid crystal molecule, thereby forming an alignment layer.

As a material of the polymer layer with which the electrode was covered, there was used a polyvinyl alcohol (PVA, polymerization degree=about 500, made by Wako Junyaku Co., Ltd.). The obtained two substrates were stuck on each other with the interposition of a spacer so as to be a uniform cell thickness, thereby preparing a liquid crystal cell. Rubbing directions were mutually converse on the opposite surfaces of the substrates. In FIG. 1, "rub." means the direction of the rubbing.

Afterward, a liquid crystal material was injected into the liquid crystal cell. As the liquid crystal material, there was used S-1132 of a phenylcyclohexane series (made by Chisso Petroleum Chemicals Co., Ltd.) which was Np liquid crystal having a positive dielectric anisotropy. As a chiral agent for controlling a chiral pitch, C15 (made by BDH) was used.

A thickness d of the resulting liquid crystal cell was 6.0 $\mu$m, and a natural pitch $P_0$ of the liquid crystal material was 10 $\mu$m. Here, $d/P_0$ was 0.6.

The thus prepared liquid crystal cell was observed under crossed nicols conditions by the use of a polarizing microscope. FIG. 4(a) shows photographs thus obtained. The polarizing microscope photographs in FIG. 4 were shot under conditions that one polarizing plate was arranged so as to conform to the alignment direction of an alignment layer and the other polarizing plate was arranged vertically to the alignment direction.

FIG. 4(a) shows an initial state under no voltage application, and if any polarizing plate is not used, the liquid crystal layer looks to be transparent. FIG. 4(b) shows a state of the liquid crystal cell to which 1 cycle of an intermittent pulse having a voltage waveform of FIG. 2 was applied. FIG. 4(c) shows a state of the liquid crystal cell to which 5 cycles of the intermittent pulse having the voltage waveform of FIG. 2 was applied.

Further description will be given with reference to FIG. 4. FIG. 4(a) is a polarizing microscope photograph showing a state (an initial state) of the liquid crystal cell to which the voltage waveform was not applied, and it exhibits a planar structure in which a twist angle is 180°. In this case, a transparent state in which the light is not scattered is observed, if any polarizing plate is not used. When the polarizing plates are crossed, a dark state is observed.

The intermittent pulse having the voltage waveform ($V_H$= 50 V and $V_L$=0.5 V) of FIG. 2 was applied to the liquid crystal cell to which any voltage was not applied, and at this time, domains which were different in a disclination line and retardation were generated as shown in FIG. 4(b), so that the liquid crystal layer became a light scattering state. In the case that 1 cycle of the intermittent pulse was applied, the liquid crystal layer gradually returned from the light scattering state to the initial state in FIG. 4(a) with time.

On the other hand, 3 or more cycles of the intermittent pulse shown in FIG. 2 were repeatedly applied to the liquid crystal layer, and at this time, the fine domains were generated in the liquid crystal layer as shown in FIG. 4(c) to form a light scattering texture having a high scattering degree. This light scattering texture remained for a long period of time.

Afterward, 3 or more cycles of the intermittent pulse of $V_H$=20 V and $V_L$=0.2 V in a voltage waveform shown in FIG. 2 were further applied again to the liquid crystal layer. At this time, the light scattering texture in the liquid crystal layer was erased, and the liquid crystal layer returned to the initial state. Afterward, it remained in a transparent state.

After the light scattering texture state of FIG. 4(c) was maintained, a square-wave AC of 1 KHz, an amplitude=20 V and a duty=50% was applied thereto, in place of the application of several cycles of the intermittent pulse shown in FIG. 2. As a result, a transmittance and applied voltage properties in FIG. 9 were exhibited, and with the rise of the voltage, the transmittance also increased. FIG. 10 shows photographs observed by the polarizing microscope, and they exhibit the states of the light scattering texture changed in compliance with the applied voltages. As is apparent from the graph in FIG. 9, a slight hysteresis was generated during a rise and the fall process of the voltage. In this case, even after the voltage was applied, the change of the light scattering texture was not observed.

In this state, the optical response properties were measured, and the results are shown in FIG. 11. The applied voltage waveform had 10 V and 1 KHz, and a rise time was 40 msec and a fall time was 15 msec, which meant a high response speed. A transmittance measurement system which was used here is shown in FIG. 3.

3 or more cycles of the intermittent pulse shown in FIG. 2 were applied, and at this time, a region having three kinds of twist angles was generated and they were simultaneously present in the liquid crystal layer. This region was a light scattering texture, and this texture was held for a long period of time. However, in the case that a square-wave AC of a duty=50% was applied to the liquid crystal layer in the initial state, the light scattering texture was formed, but afterward, the light scattering texture disappeared with time.

What is claimed is:

1. A light scattering liquid crystal display device having a liquid crystal cell comprising:

at least electrode and alignment layers formed on facing surfaces of each of a pair of opposing substrates;

a chiral nematic liquid crystal layer having a planar structure and sealed between the pair of substrates;

a voltage application device configured to apply an application voltage having a predetermined waveform to both of the electrodes, and wherein said predetermined waveform is selected such that a light scattering texture comprising a simultaneous group of at least three planar structures having different twist angles is either generated, held or erased in the chiral nematic liquid crystal layer.

2. The light scattering liquid crystal display device according to claim 1, wherein said predetermined waveform comprises at least the cycles of an intermittent pulse voltage.

3. The light scattering liquid crystal display device according to claim 1 wherein said predetermined waveform comprises at least three cycles of an intermittent pulse voltage, and wherein a first magnitude of said intermittent pulse voltage generates a light scattering texture in the chiral nematic liquid crystal layer and is higher than a second magnitude of said intermittent pulse voltage which erases the light scattering texture.

4. The light scattering liquid crystal display device according to claim 1, wherein said predetermined waveform comprises an alternating voltage, and a light scattering ability of the light scattering texture in the chiral nematic liquid crystal layer is changed according to the peak voltage of the alternating voltage to carry out a gradation display.

5. The light scattering liquid crystal display device according to claim 1, wherein a twist angle of the planar structure in an initial state of the chiral nematic liquid crystal layer is in the range of 90° to 270°.

6. The light scattering liquid crystal display device according to claim 1, wherein a twist angle of the planar structure in an initial state of the chiral nematic liquid crystal layer is in the range of 90° to 270°, and a pretilt angle of a liquid crystal molecule with respect to the pair of substrates is in the range of 0° to 30°.

7. The light scattering type liquid crystal display device according to claim 1, wherein a ratio of a thickness of the liquid crystal layer to a natural pitch of the chiral nematic liquid crystal is in the range of 0.3 to 1.0.

8. The light scattering type liquid crystal display device according to claim 1 wherein the chiral nematic liquid crystal layer comprises a liquid crystal composition containing at least 50% by weight of one or more liquid crystal compounds selected from the group consisting of phenylcyclohexanes, cyclohexylcyclohexanes, cyclohexyl, bicyclohexyl and cyclohxylphenyl esters of benzoic acid, phenyl, cyclohexylphenyl, bicyclohexyl and cyclohexyl esters of cyclohexanecarboxylic acid, cyclohexylbiphenyls, 4,4'-dicyclohexyl-biphenyls, phenyl and cyclohexyl esters of cyclohexylbenzoic acid, phenyl and cyclohexyl esters of cyclohexylcyclohexanecarboxylic acid, phenyl-1,3-dioxanes and cyclohexyl-1,3-dioxanes.

9. A method of driving a light scattering liquid crystal display device having a liquid crystal cell comprising at least electrode and alignment layers formed on facing surfaces of each of a pair of opposing substrates, a chiral nematic liquid crystal layer having a planar structure and sealed between the pair of substrates, and a voltage application device, said method comprising:

repeatedly applying at least three cycles of an intermittent pulse voltage having a predetermined waveform to both of the electrodes from the voltage application device; and generating, holding, or erasing a light scattering texture comprising a simultaneous group of at least three planar structures having different twist angles in the chiral nematic liquid crystal layer based on said predetermined waveform.

10. A method of driving a light scattering liquid crystal display device having a liquid crystal cell comprising at least electrode and alignment layers formed on facing surfaces of each of a pair of opposing substrates, a chiral nematic liquid crystal layer having a planar structure and sealed between the pair of substrates, and a voltage application device, said method comprising:

repeatedly applying at least three cycles of an intermittent pulse voltage having a predetermined waveform to both of the electrodes from the voltage application device; and generating, holding, or erasing a light scattering texture comprising a simultaneous group of at least three planar structures having different twist angles in the chiral nematic liquid crystal layer based on said predetermined waveform, and wherein a first magnitude of said intermittent pulse voltage generates a light scattering texture in the chiral nematic liquid crystal layer and is higher than a second magnitude of said voltage which erases the light scattering texture.

11. A method of driving a light scattering liquid crystal display device having a liquid crystal cell comprising at least electrode and alignment layers formed on facing surfaces of each of a pair of opposing substrates, a chiral nematic liquid crystal layer having a planar structure and sealed between the pair of substrates, and a voltage application device, said method comprising:

repeatedly applying at least three cycles of an intermittent pulse voltage having a predetermined waveform to both the electrodes from the voltage application device;

generating, holding, or erasing a light scattering texture comprising a simultaneous group of at least three planar structures having different twist angles in the chiral nematic liquid crystal layer based on said predetermined waveform; and when holding said light scattering texture, applying a predetermined alternating voltage to said electrodes from said voltage application device to change a light scattering ability of said light scattering texture in order to achieve a gradation display.

* * * * *

UNITED STATES PATENT AND TRADEMARK OFFICE
CERTIFICATE OF CORRECTION

PATENT NO. : 6,118,422
DATED : September 12, 2000
INVENTOR(S) : Kohki Hiroshima, et al.

It is certified that error appears in the above-identified patent and that said Letters Patent is hereby corrected as shown below:

Cover page item [75], after Hiroshima change "Yamanasi" to --Yamanashi--.

Column 13,
Line 6, (Claim 2) change "the" to --three--;
Line 41, (Claim 8) change "cyclohxylphenyl" to --cyclohexylphenyl--.

Signed and Sealed this

Nineteenth Day of June, 2001

*Attest:*

NICHOLAS P. GODICI
*Attesting Officer*  *Acting Director of the United States Patent and Trademark Office*